(12) United States Patent
Otto

(10) Patent No.: US 10,150,260 B2
(45) Date of Patent: Dec. 11, 2018

(54) METHOD AND APPARATUS FOR DISPENSING REFRIGERATED FIBER PREPREG ROLLS

(71) Applicant: GENERAL ELECTRIC COMPANY, Schenectady, NY (US)

(72) Inventor: Collin James Otto, Ellisville, MS (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 15/064,427

(22) Filed: Mar. 8, 2016

(65) Prior Publication Data

US 2017/0259510 A1    Sep. 14, 2017

(51) Int. Cl.
*G01G 17/02* (2006.01)
*B29C 70/02* (2006.01)

(52) U.S. Cl.
CPC .......... *B29C 70/021* (2013.01); *G01G 17/02* (2013.01)

(58) Field of Classification Search
CPC ........ G01G 17/00–17/02; G01G 19/00; G01G 19/52; B29C 70/021
See application file for complete search history.

(56) References Cited

U.S. PATENT DOCUMENTS

| | | |
|---|---|---|
| 3,785,582 A | 1/1974 | Girard |
| 4,137,977 A | 2/1979 | Alger |
| 4,285,752 A | 8/1981 | Higgins |
| 5,223,072 A | 6/1993 | Brockman et al. |
| 5,497,659 A * | 3/1996 | Roder .................... B65H 16/02 226/28 |
| 5,504,278 A | 4/1996 | Deters et al. |
| 6,022,207 A * | 2/2000 | Dahlin ................... B33Y 30/00 242/563.2 |
| 6,384,349 B1 | 5/2002 | Voll |
| 2015/0027239 A1* | 1/2015 | Konkle ................ B65H 63/084 73/862.627 |

FOREIGN PATENT DOCUMENTS

| | | |
|---|---|---|
| EP | 2620240 B1 | 9/2015 |
| GB | 2058021 A | 4/1981 |

\* cited by examiner

*Primary Examiner* — Natalie Huls
(74) *Attorney, Agent, or Firm* — General Electric Company; Brian Overbeck

(57) ABSTRACT

The present disclosure generally relates to a method for dispensing material from a roll. The method monitors the weight of a first material roll using a load cell attached to a frame holding the first material roll. The method dispenses material from the first material roll. The method determines, based on at least the weight of the first material roll, when to remove a second material roll from a refrigerator or freezer to reduce the amount of time between the thawing of the second roll and replacing the first roll with the second roll. Also disclosed is an apparatus for dispensing the material from the roll.

19 Claims, 7 Drawing Sheets

METHOD AND APPARATUS FOR DISPENSING REFRIGERATED FIBER PREPREG ROLLS

INTRODUCTION

The present disclosure generally relates to a method and apparatus for dispensing fiber prepreg material from rolls compatible with high-volume manufacturing conditions, where the prepreg rolls require a refrigeration-thawing cycle.

BACKGROUND

Fiber composite materials, also known as prepregs, are composite materials having a reinforcement fiber that is pre-impregnated with a thermoplastic or thermoset resin matrix. The resin holds the fibers together and enables formation of unidirectional fibers or fabric. The amount of resin within the matrix is generally the amount desired in the final composite material so that no additional resin need be applied during manufacturing, hence the name "prepreg." The resin matrix in a prepreg is usually partially cured for ease of handling. Sheets of prepreg are provided with silicone-coated paper on each side and sold in a roll format. The prepreg material is applied to an article then heated, for example in an autoclave, to fully cure and polymerize the resin in the desired shape composite article. The prepreg rolls are stored in a freezer, generally at 0° F. for up to six-months, to prevent premature polymerization or curing during storage.

Manufacturing composite materials requires thawing the prepreg after removal from the freezer for a set period of time. Thawing of such a material can take several hours, sometimes upwards of 16 hours. The amount of time a prepreg material spends at room temperature is critical to its shelf-life. When a prepreg roll is removed from the freezer, the amount of time it is out of the freezer must be carefully noted. This is generally referred to as the roll's "out-time." If the entire roll is not consumed during one out-time, the remainder be returned to the freezer to preserve the material's shelf life.

As manufacturing volume increases, the present inventors have found several problems with conventional prepreg roll systems resulting in either downtime of the manufacturing line or unacceptable waste due to out of time material. When working through a roll of prepreg, it is critical to know exactly how much material is left on the roll to determine whether removing the next roll from the freezer will be necessary to complete a job. Operators will begin to thaw the next roll if they estimate they will need additional material to complete a project. In practice, this requires keeping track of exactly how much material has been removed from a roll and the rate at which it is being removed.

If the operator underestimates the amount of material left on the roll, and begins unnecessarily thawing a new roll, that material could exceeding its out-time and is therefore wasted. If the operator overestimates the amount of material left on the roll, the entire process might shut down while awaiting the next roll begins to thaw. This can also result in problems with uncured material present on a partially built workpiece. If the uncured prepreg goes out-time, then the partially built uncured part could be sacrificed.

In order to avoid out-time prepreg, operators base their estimate the amount of remaining material by keeping track of the length of plies cut from a roll of material. These estimates often contain rounding error, gauge error, and typographical errors in maintaining the amount of material cut. The result is that preparation, including thawing, of the new roll begins too early or too late and the corresponding wasted material or process downtime as discussed above. Although these methods have worked for lower volume manufacturing operations, as throughput has increased the need systems that better monitor and control the process are needed.

SUMMARY

The present invention generally relates to a novel method for dispensing material from a roll. The method monitors the weight of a first material roll using a load cell attached to a frame holding the first material roll. The method dispenses material from the first material roll. The method determines, based on at least the weight of the first material roll, when to remove a second material roll from a refrigerator or freezer to reduce the amount of time between the thawing of the second material roll and replacing the first material roll with the second material roll.

The present invention also relates to a method that determines an amount of a first material roll by measuring a weight of the first material roll. The method determines whether the weight is below a threshold. The threshold is associated with an amount of time at which all of the first material roll is unrolled. The method transmits an alert to prepare a second material roll before the first material roll is empty.

The present invention also relates to an apparatus including a frame. The apparatus includes a first material roll disposed on the frame. The apparatus includes a load cell configured to monitor the weight of a first material roll. The apparatus includes a system configured to determine, based on at least the weight of the first material roll, when to remove a second material roll from a refrigerator or freezer to reduce the amount of time between the thawing of the second material roll and replacing the first material roll with the second material roll.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present invention relates to a system and method for dispensing material from a roll. In an embodiment, the first material roll is of fiber composite materials, also known as prepregs, which are composite materials having a reinforcement fiber that is pre-impregnated with a thermoplastic or thermoset resin matrix. The resin holds the fibers together and enables formation of unidirectional fibers or fabric. Prepregs that may be used in the present invention include Plainweave, 5Harness, Lighting Strike, Fiberglass, and Core Splice. However, one of ordinary skill in the art will appreciate that rolled material according to the invention is not limited to those listed above.

Figure 1:
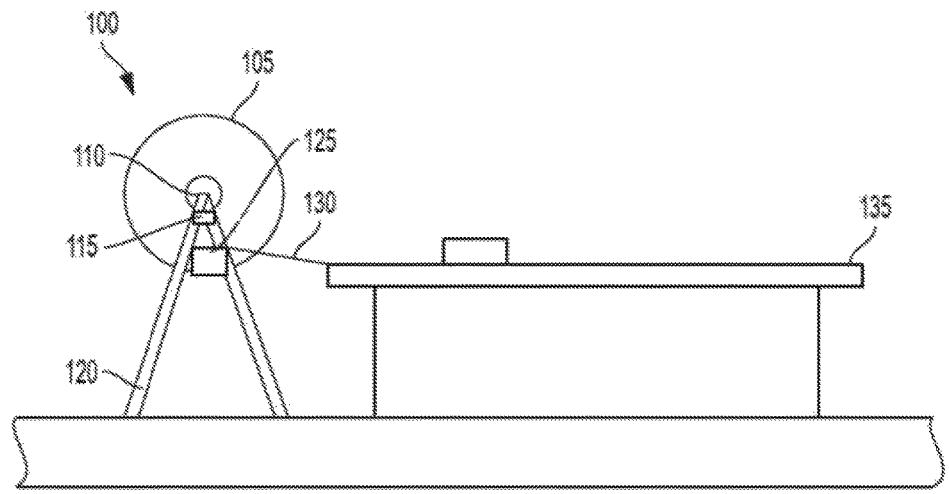
FIG. 1 illustrates an exemplary embodiment of a just-in-time (JIT) rolled material system.

FIG. 1 illustrates an exemplary embodiment of a just-in-time (JIT) rolled material system 100. As shown, the JIT rolled material system includes a roll of lifetime limited material 105, a spindle 110, a load cell 115, a frame 120, communication apparatus 125, unrolled material 130 and cutting table 135. As shown, the frame 120 of the JIT rolled material system 100 supports the spindle 110. The roll 105 is supported by the spindle 110. As the material 130 is unrolled from the roll material 105 onto the cutting table 135. The cutting table 135 may be an automated cutting table configured to cut a predefined amount of material off of the roll 105. The roll 105 of material may be a roll of a prepreg material such as the prepregs discussed above.

The load cell 115 is arranged with the spindle 110. The communication apparatus 125 is arranged with the frame 120 and communicatively coupled to the load cell 115.

The load cell 115 is configured to measure the weight of the spindle 110 and the material roll 105 and convert the measurement to an electronic signal. The electronic signal may then be received at the communication apparatus 125. The communication apparatus 125 may comprise a computer system having a processor configured to process the information received from the load cell 115. For instance, the communication apparatus 125 may receive an electronic signal comprising information about the measured weight of the spindle 110 and the roll 105. The processor may compare the weight information to a threshold weight. If the measured weight is the threshold weight or below, the communication apparatus may transmit an alert. As will be described in greater detail below, such an alert may include transmitting a wireless notification, displaying a notification, and/or generating an audible alarm. The notification may be used to notify an operator that it is time to prepare a new roll of material because the material roll 105 is likely to run out of material at approximately the same time as it would take to prepare a new roll of prepreg material.

For instance, a roll of "lightning strike" material, manufactured by Cytec Industries, Inc., is known to require 16 hours of thaw time. Accordingly, the communication apparatus 125 may be configured to generate the alert when the communication apparatus 125 determines that the roll 105 may run out of material in about 16 hours. In such instances, the communication apparatus 125 may receive input from an operator of the JIT rolled material system 100 of a known weight at which the roll will be emptied in 16 hours. Such input may be received by an input device such as a keyboard at the communication apparatus 125 or via a wireless signal received from another device. The known weight corresponds to an amount of material. Similarly, the communication apparatus 125 may receive an input of a length to set as the threshold. The communication apparatus 125 may maintain a storage of the weight per linear foot of different types of prepreg materials and the communication apparatus 125 may convert the input length to a weight based on the weight per linear foot of the material type. The communication apparatus 125 may then generate an alert when the weight measured by the load cell 115 reaches the converted weight.

The JIT material system 100 improves production efficiency with lifetime limited materials like prepregs by providing precise weight measurements that correlate with the amount of material left on the roll. The ability to precisely identify the amount of material remaining on a roll provides the operator(s) of the JIT material system 100 the ability to ensure that a replacement roll of material is ready for use at approximately the same time as the roll 105 runs out of material. Thus, the lifetime limited material does not suffer from the complications that come from beginning preparation of the new roll too soon or too late.

Figure 2:
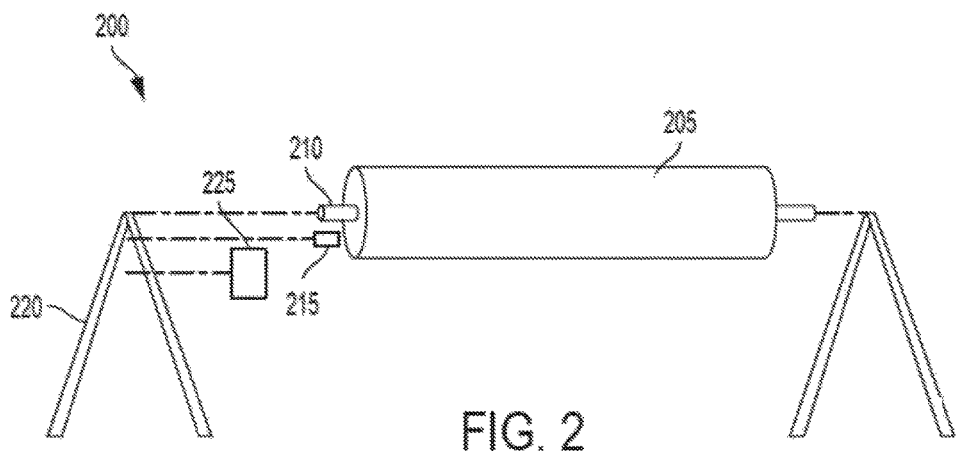
FIG. 2 illustrates an exemplary embodiment of an exploded view of the JIT rolled material system.

FIG. 2 illustrates an exemplary embodiment of an exploded view of the JIT rolled material system 200. The JIT rolled material system 200 includes a lifetime limited material roll 205, a spindle 210, a load cell 215, a frame 220, and a communication apparatus 225. The components 205-225 of the JIT rolled material system correspond to the components 105-125 of the JIT rolled material system 100 of FIG. 1 and the description of the components will not be repeated for simplicity.

Figure 3:
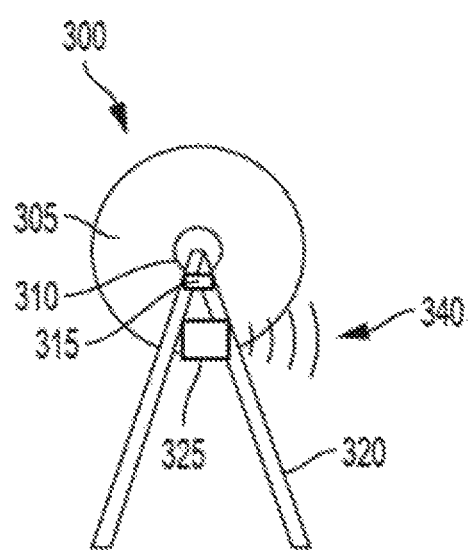
FIG. 3 illustrates an exemplary embodiment of a JIT rolled material system when an alert is generated.

FIG. 3 illustrates an exemplary embodiment of a JIT rolled material system 300 when an alert is generated. The JIT rolled material system 300 includes a lifetime limited material roll 305, a spindle 310, a load cell 315, a frame 320, a communication apparatus 325, and an alert 340. The components 305-325 of the JIT rolled material system correspond to the components 105-125 of the JIT rolled material system 100 of FIG. 1 and the description of the components will not be repeated for simplicity.

As shown, the amount of lifetime limited material left on the roll 305 is below the predetermined threshold amount discussed above with respect to FIG. 1. As a result, the communication apparatus 325 has generated an alert 340. As discussed above, the alert 340 may be audio and/or visual notification from the communication apparatus 325. Alternatively or conjunctively, the alert 340 may be a wireless transmission such as an email that is transmitted to an operator's email account. One of ordinary skill in the art will appreciate that the type of alert that is generated is not limited to those discussed above. Any suitable alert that notifies an operator that the amount of material on the roll is below the threshold would be sufficient without departing from the scope of the invention.

Figure 4:
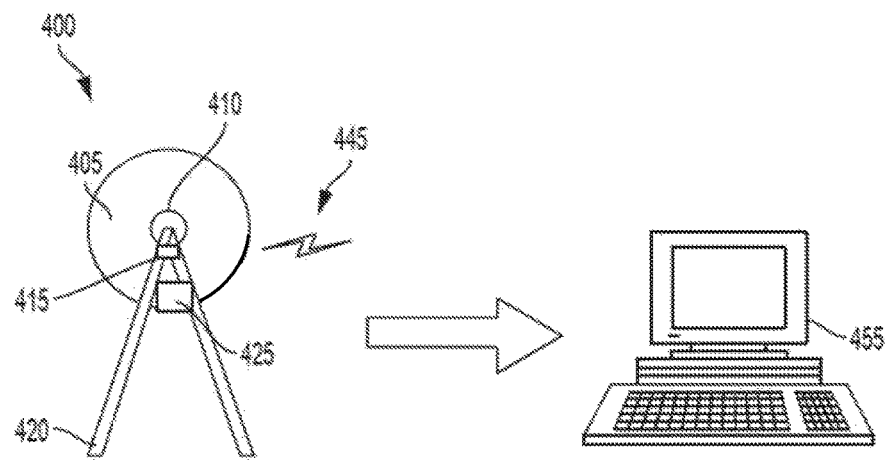
FIG. 4 illustrates an exemplary embodiment of a wireless transmission from the JIT rolled material system.

FIG. 4 illustrates an exemplary embodiment of a wireless transmission from the JIT rolled material system 400. The JIT rolled material system 400 includes a lifetime limited material roll 405, a spindle 410, a load cell 415, a frame 420, a communication apparatus 425, electronic transmission 445, and a computer 455. The components 405-425 of the JIT rolled material system correspond to the components 105-125 of the JIT rolled material system 100 of FIG. 1 and the description of the components will not be repeated for simplicity.

As shown, similar to FIG. 3, the amount of lifetime limited material left on the roll 405 has fallen below a threshold amount. As a result an alert in the form of an electronic transmission 445 has been transmitted. Such transmissions may be transmitted over a wired or wireless network. The electronic transmission 445 may be transmitted to a wireless network, which then forwards the transmission to an email server. The email server may then provide the email message to the appropriate email account or group associated with the operator(s) of the JIT rolled material system 400. Accordingly, an email alert may be available to the computer 455 for display.

Additionally, the communication apparatus 425 may be configured to generate alerts at multiple threshold weights. For instance, the communication apparatus 425 may generate an alert at a threshold warning the operator that he has approximately 2 more hours until the preparation of a new roll should begin. With multiple thresholds, different email alerts may be generated indicating the type of threshold that may have been reached.

Figure 5:
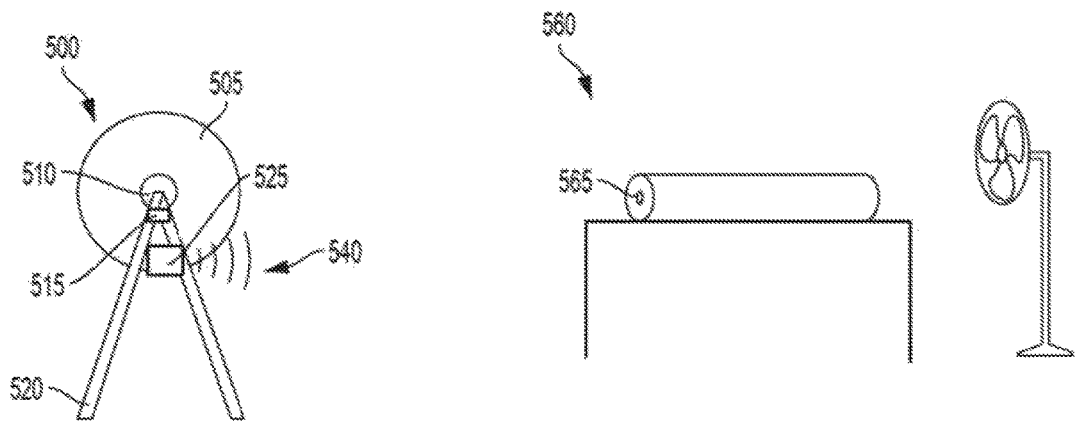
FIG. 5 illustrates an exemplary embodiment of the JIT rolled material system and a new roll staging area.

FIG. 5 illustrates an exemplary embodiment of the JIT rolled material system 500 and new roll staging area 560. The JIT rolled material system 500 includes a first material roll 505, a spindle 510, a load cell 515, a frame 520, a communication apparatus 525, and alert 540. The new roll staging area 560 includes a second material roll 565. The components 505-525 of the JIT rolled material system correspond to the components 105-125 of the JIT rolled material system 100 of FIG. 1 and the description of the components will not be repeated for simplicity.

As shown, an alert 540 has been generated from the communication apparatus 525 because the weight of the material on the first roll 505 reached a threshold weight. The alert 540 indicates to the operator(s) of the JIT rolled material system that it is time to prepare the second roll 565 to replace the first roll 505 so as to maximize manufacturing time and cost efficiency. As a result, the second roll 565 has been removed from a freezer to begin the thawing process. The JIT rolled material system is designed such that the problems of thawing the roll too early or too late are eliminated.

Figure 6:
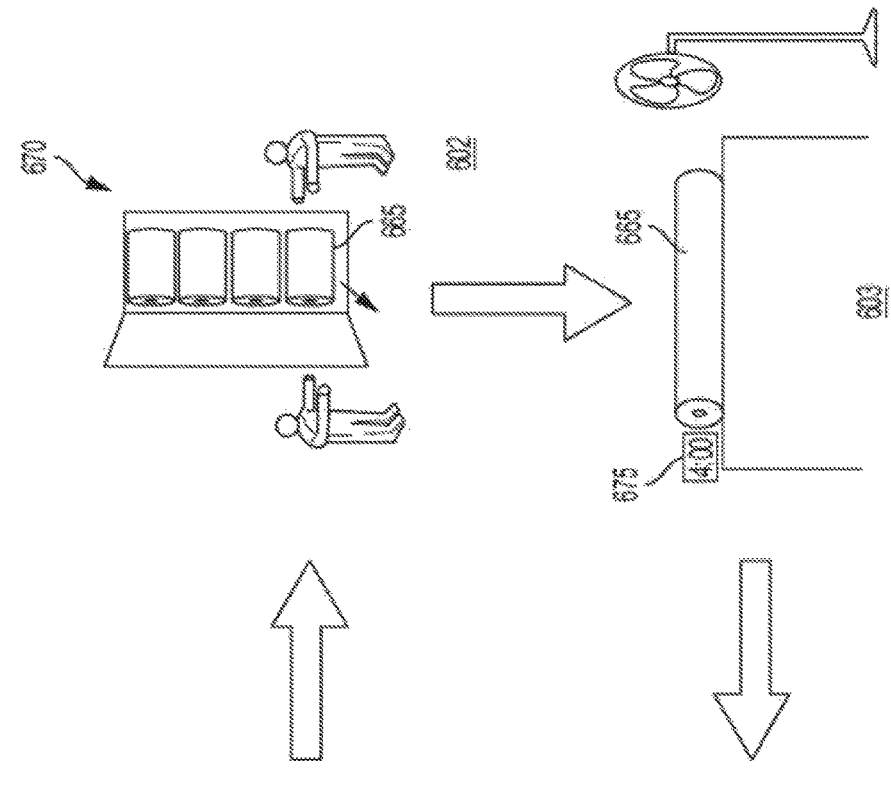
FIG. 6 illustrates an exemplary embodiment of the JIT rolled material system process of efficiently switching material rolls.
Figure 6:
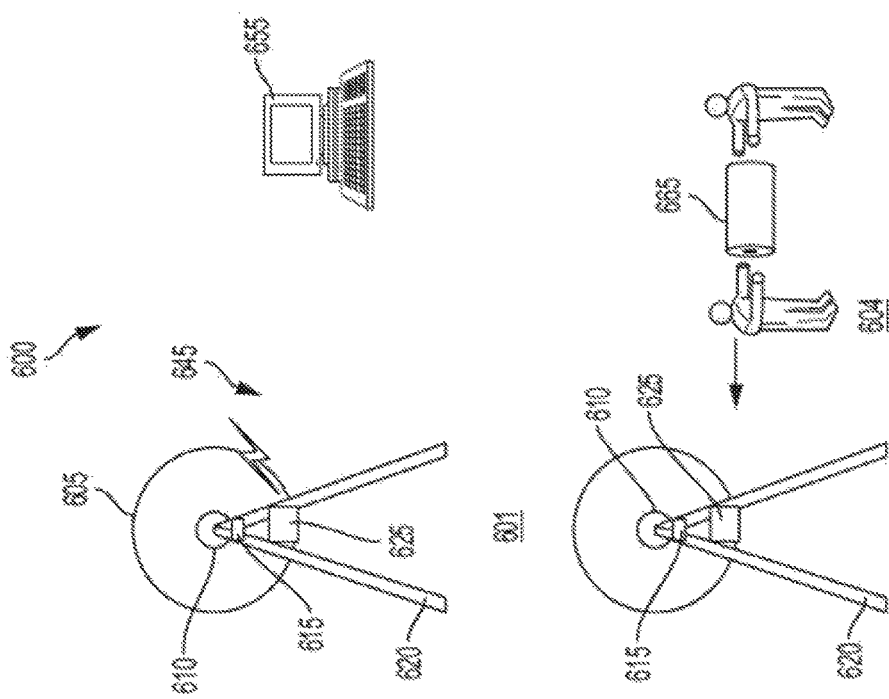

FIG. 6 illustrates an exemplary embodiment of the JIT rolled material system process of efficiently switching material rolls. As shown, FIG. 6 illustrates four stages 601-604 of the process 600 for switching a material roll. The JIT rolled material system 600 includes a first material roll 605, a spindle 610, a load cell 615, a frame 620, a communication apparatus 625, electronic transmission 645, and a computer 655. The components 605-625 of the JIT rolled material system correspond to the components 105-125 of the JIT rolled material system 100 of FIG. 1. The components 645 and 655 of the JIT rolled material system correspond to the components 445 and 455 of the JIT rolled material system 400 of FIG. 4. The description of these components will not be repeated for simplicity. FIG. 6 also includes a cooling system 670, a second material roll 665 of lifetime limited material, and a timer 675.

As shown, in the first stage 601, an electronic transmission 645 is generated to alert the operator of the JIT rolled material system that the weight of the material on the first material roll 605 has reached the threshold. The transmitted alert may be viewed at the computer 655. Accordingly, in the second stage 602, the second material roll 665 of lifetime limited material is removed from the cooling system. Such a cooling system may be a freezer or a refrigerator that maintains a temperature below the temperature at which the lifetime limited material begins to cure. For instance, the cooling system 670 may maintain a temperature of below 10° C.

In the third stage 603, the new roll 665 may be moved to a staging area where it can thaw for the requisite amount of time for the type and amount of material on the second material roll 665. The timer 675 may indicate the amount of time until the new roll 665 is thawed. However, the timer 675 could be comprised in any suitable device such as an operator's computer system running a software program that tracks the thaw time or out-time of the second material roll 665.

In the fourth stage the new roll 665 has completed thawing, and the first material roll 605 has been removed from the spindle 610. In the fourth stage, the second material roll 665 completed thawing at around the same time as the JIT rolled material system is prepared to accept the second material roll 665. Such preparation may include removing any waste from the first material roll 605 and recalibrating the load cell 615 and/or communication apparatus 625 for the second material roll 665. For instance, the communication system 665 may receive input of the type of material on the second material roll 665 and determine new alert thresholds based on the known weight per linear foot of the second material roll 665. Once the second material roll 665 is placed about the spindle 610, the operators of the JIT rolled material system 600 may begin manufacturing again. Thus, the process of FIG. 6 minimizes manufacturing downtime. The process also minimizes cost because the material is thawed at an optimal time minimizing the likelihood of the second material roll 665 out-times, rendering it unusable.

Figure 7:
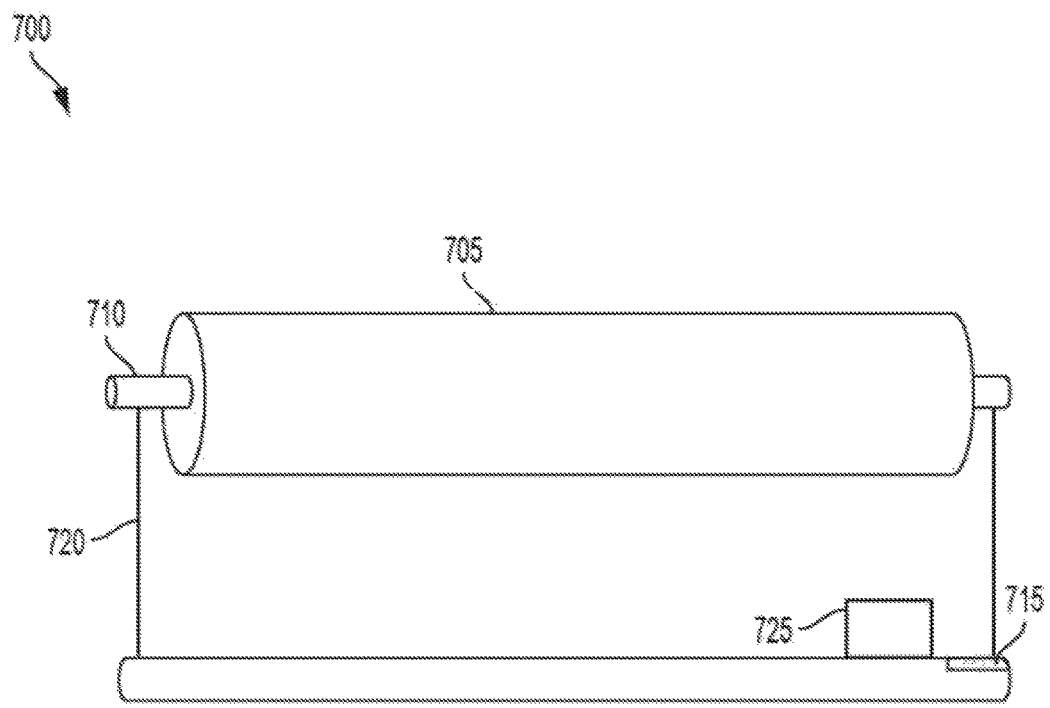
FIG. 7 illustrates an exemplary embodiment of a JIT rolled material system.

FIG. 7 illustrates an exemplary embodiment of a JIT rolled material system 700. The JIT rolled material system 700 includes a lifetime limited material roll 705, a spindle 710, a load cell 715, a frame 720, and a communication apparatus 725. The components 705-725 of the JIT rolled material system correspond to the components 105-125 of the JIT rolled material system 100 of FIG. 1 and the description of the components will not be repeated for simplicity.

The JIT rolled material system 700 is similar to the JIT rolled material systems of FIGS. 1-6. However, as illustrated in FIG. 7, the load cell 715 is disposed below the frame 720. As a result, the weight of the frame 720, along with the weight of the spindle 710 would be taken into consideration when determining the amount of material on the roll 705. For instance, the weight of the frame 720 and the spindle 710 may be known. Accordingly, the communication apparatus 725 may be configured to subtract the weight of the frame 720 and the spindle 710 measured by the load cell when determining whether the amount of material on the roll 705 reaches the threshold value.

Figure 8:
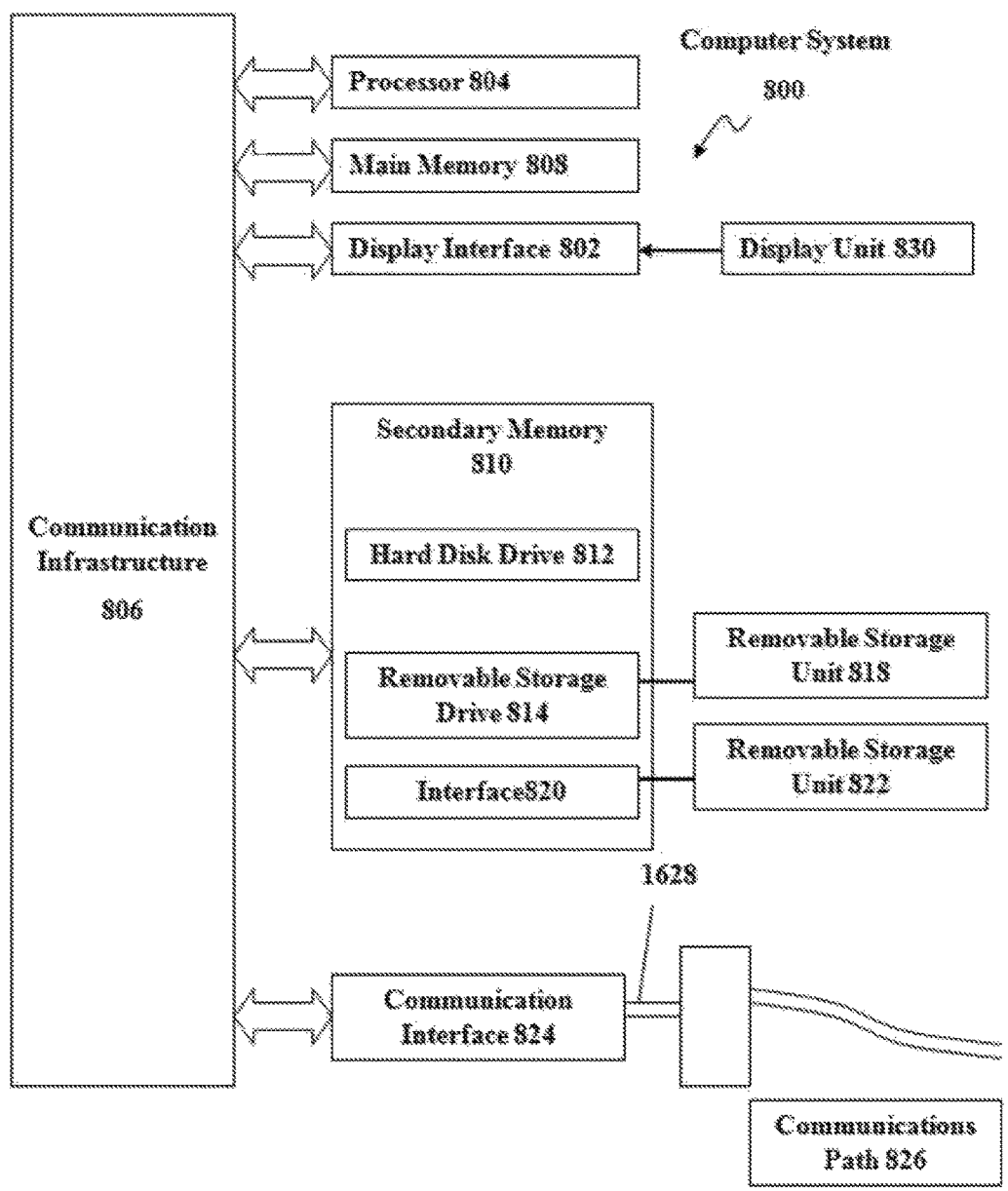
FIG. 8 presents an example system diagram of various hardware components and other features, for use in accordance with an example implementation of a communication apparatus.

FIG. 8 presents an example system diagram of various hardware components and other features, for use in accordance with an example implementation of a communication apparatus such as the communication apparatus described with respect to FIG. 1 and similarly in FIGS. 2-7.

Aspects of the communication apparatus may be implemented using hardware, software, or a combination thereof, and may be implemented in one or more computer systems or other processing systems. In one implementation, aspects of the communication apparatus are directed toward one or more computer systems capable of carrying out the functionality described herein. An example of such a computer system 800 is shown in FIG. 8.

Computer system 800 includes one or more processors, such as processor 804. The processor 804 is connected to a communication infrastructure 806 (e.g., a communications bus, cross-over bar, or network). Various software implementations are described in terms of this example computer system. The computer system 800 may be communicatively coupled to a load cell such as the load cell 115 in order to receive feedback associated with the weight of the roll. The processor 804 may process the weight and compare the measured weight to a threshold stored in memory. After reading this description, it will become apparent to a person skilled in the relevant art(s) how to implement aspects of the communication apparatus using other computer systems and/or architectures.

Computer system 800 can include a display interface 802 that forwards graphics, text, and other data from the communication infrastructure 806 (or from a frame buffer not shown) for display on a display unit 830. Computer system 800 also includes a main memory 808, preferably RAM, and may also include a secondary memory 810. The secondary memory 810 may include, for example, a hard disk drive 812 and/or a removable storage drive 814, representing a floppy disk drive, a magnetic tape drive, an optical disk drive, etc. The hard disk drive 812 or the removable storage drive 814 may maintain the weight per linear foot of the different types of material. The removable storage drive 814 reads from and/or writes to a removable storage unit 818 in a well-known manner. Removable storage unit 818, represents a floppy disk, magnetic tape, optical disk, etc., which is read by and written to removable storage drive 814. As will be appreciated, the removable storage unit 818 includes a computer usable storage medium having stored therein computer software and/or data. Alternatively, the computer system 800 may not maintain any type of long term storage. As such, the computer system may be in communication with another computer system configured to provide the material weight information to the communication apparatus over a network connection.

In alternative implementations, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an EPROM, or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828, which may be electronic, electromagnetic, optical or other signals capable of being received by communications interface 824. These signals 828 are provided to communications interface 824 via a communications path (e.g., channel) 826. This path 826 carries signals 828 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 814, a hard disk installed in hard disk drive 812, and signals 828. These computer program products provide software to the computer system 800. Aspects of the invention are directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features in accordance with aspects of the present invention, as discussed herein. In particular, the computer programs, when executed, enable the processor 810 to perform various features. Accordingly, such computer programs represent controllers of the computer system 800.

In an implementation where aspects of the invention are implemented using software, the software may be stored in a computer program product and loaded into computer system 800 using removable storage drive 814, hard drive 812, or communications interface 820. The control logic (software), when executed by the processor 804, causes the processor 804 to perform various functions as described herein. In another implementation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another implementation, aspects of the invention are implemented using a combination of both hardware and software.

Figure 9:
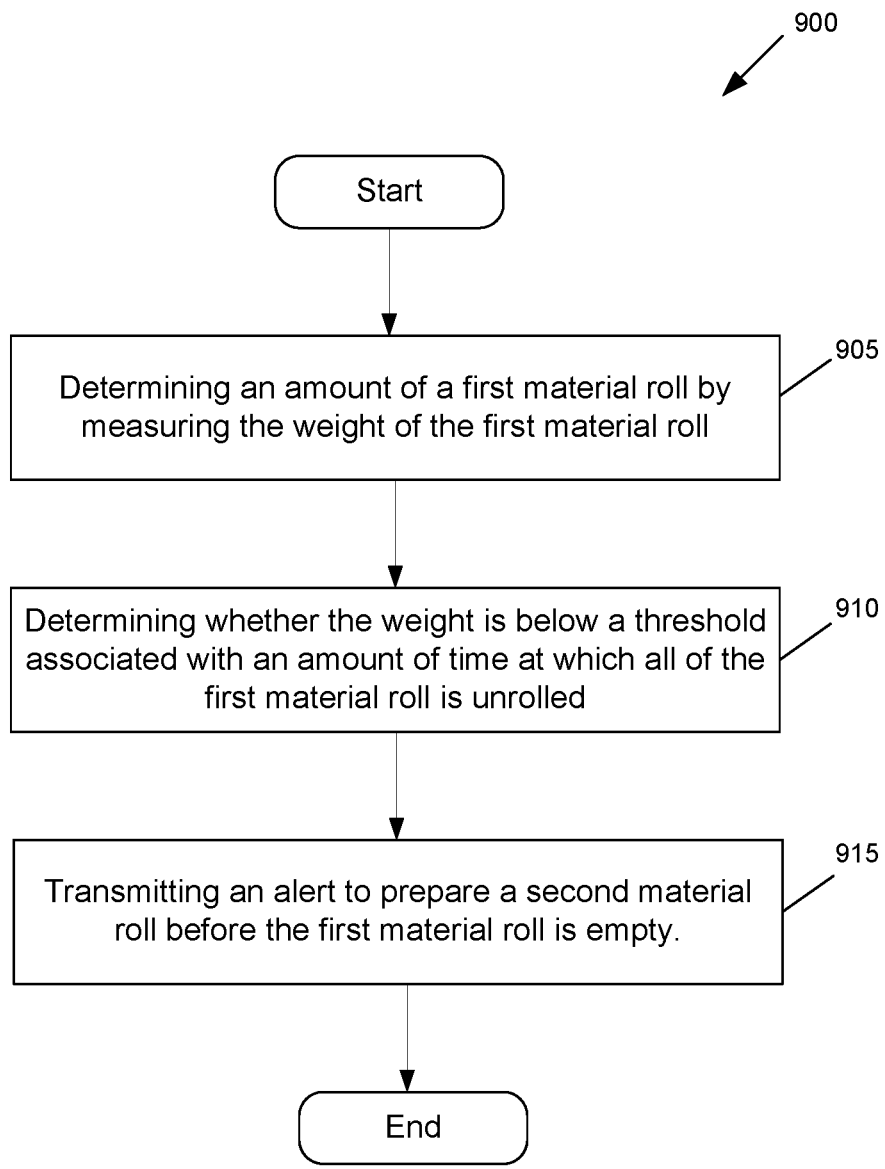
FIG. 9 conceptually illustrates a process for the JIT rolled material system.

FIG. 9 conceptually illustrates a process 900 for the JIT rolled material system. The process 900 may be performed by the computer system 800 and the load cell 115. The process 800 may start when a roll of material is loaded onto the JIT rolled material system.

As shown, the process 900 determines (at 905) an amount of a first material roll by measuring the weight of the first material roll. The process 900 determines (at 910) whether weight is below a threshold associated with an amount of time at which all of the first material roll is unrolled. The process 900 transmits (at 915) an alert to prepare a second material roll before the first material roll is empty.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An apparatus comprising: a frame; a first material roll disposed on the frame; a load cell configured to monitor a weight of the first material roll; a cooling system comprising a refrigerator or a freezer for storing a second material roll; and a system configured to determine, based on at least the weight of the first material roll, an optimal time for removal of the second material roll from the cooling system to reduce an amount of time between a thawing of the second material roll and replacing the first material roll with the second material roll.

2. The apparatus of claim 1, wherein the system is further configured to receive an electronic signal from the load cell associated with the weight of the first material roll, wherein the system transmits an alert when the weight of the first material roll is below a threshold, and wherein the threshold is preset according to an estimated time for replacing the first material roll.

3. The apparatus of claim 2, wherein the estimated time is an estimated time required for the second material roll to thaw.

4. The apparatus of claim 2, wherein the threshold is determined based on a material type.

5. The apparatus of claim 4, wherein the material type is associated with a thaw time.

6. The apparatus of claim 5, wherein the threshold is determined such that the time in which the first material roll is ready for replacement corresponds to the thaw time.

7. The apparatus of claim 6, wherein the load cell is coupled to the spindle.

8. The apparatus of claim 1, further comprising a spindle coupled to the frame and supporting the first material roll.

9. The apparatus of claim 1, wherein the load cell is coupled to the frame.

10. A method comprising:
- determining an amount of a first material roll by measuring a weight of the first material roll;
- determining whether the weight is below a threshold, the threshold associated with an amount of time at which all of the first material roll is unrolled;
- transmitting an alert to remove a second material roll from a refrigerator or a freezer before the first material roll is empty;
- removing the second material roll from the refrigerator or the freezer based on the alert;
- placing the second material roll for thawing; and
- replacing the first material roll by the second material roll.

11. The method of claim 10, wherein the threshold corresponds to a thaw time for the second material roll.

12. The method of claim 10, wherein determining the amount of the first material roll further comprises determining a type of material on the first material roll.

13. The method of claim 12, wherein determining the amount of the first material roll further comprises determining the weight per linear foot of the first material roll based on the determined type of material.

14. The method of claim 12, wherein the type of material is a prepreg.

15. A method for dispensing material from a roll comprising:
- monitoring a weight of a first material roll, wherein the monitoring uses a load cell attached to a frame holding the first material roll;
- dispensing a material from the first material roll;
- determining, based on at least the weight of the first material roll, an optimal time for removal of a second material roll from a refrigerator or a freezer to reduce an amount of time between a thawing of the second material roll and replacing the first material roll with the second material roll;
- removing the second material roll from the refrigerator or the freezer based on the optimal time for removal of the second material roll;
- placing the second material roll for thawing; and
- replacing the first material roll by the second material roll.

16. The method of claim 15, further comprising transmitting an alert to remove the second material roll.

17. The method of claim 16, wherein the alert is associated with the optimal time for removal of the second material roll to prevent expiration of the material.

18. The method of claim 16, wherein the alert is associated with the optimal time for removal of the second material roll to prevent lag time between finishing the first material roll and the thawing of the second material roll.

19. The method of claim 15, wherein at least one of the first and second material rolls are prepregs.

* * * * *